(12) United States Patent
Li et al.

(10) Patent No.: US 12,530,879 B2
(45) Date of Patent: Jan. 20, 2026

(54) MODEL INTERPRETATION METHOD, IMAGE PROCESSING METHOD, ELECTRONIC DEVICE, AND STORAGE MEDIUM

(71) Applicant: Beijing Baidu Netcom Science Technology Co., Ltd., Beijing (CN)

(72) Inventors: Xuhong Li, Beijing (CN); Jiamin Chen, Beijing (CN); Haoyi Xiong, Beijing (CN); Dejing Dou, Beijing (CN)

(73) Assignee: Beijing Baidu Netcom Science Technology Co., Ltd., Beijing (CN)

( * ) Notice: Subject to any disclaimer, the term of this patent is extended or adjusted under 35 U.S.C. 154(b) by 480 days.

(21) Appl. No.: 18/099,551

(22) Filed: Jan. 20, 2023

(65) Prior Publication Data

US 2024/0104906 A1    Mar. 28, 2024

(30) Foreign Application Priority Data

Sep. 15, 2022   (CN) .......................... 202211120815.4

(51) Int. Cl.
*G06V 10/776* (2022.01)
(52) U.S. Cl.
CPC ................... *G06V 10/776* (2022.01)
(58) Field of Classification Search
CPC ...... G06V 10/776; G06V 10/82; G06N 3/063; G06N 3/08
See application file for complete search history.

(56) References Cited

U.S. PATENT DOCUMENTS

| 2021/0012102 A1* | 1/2021 | Cristescu | G06F 40/284 |
| 2023/0196710 A1* | 6/2023 | Pan | G06N 3/0455 |
| | | | 382/173 |

FOREIGN PATENT DOCUMENTS

| CN | 112861933 A | 5/2021 |
| CN | 113868414 A | 12/2021 |
| CN | 114004340 A | 2/2022 |
| CN | 114021718 A | 2/2022 |
| CN | 114511064 A | 5/2022 |

OTHER PUBLICATIONS

"Sarhtak Jain et. al., Attention is not Explanation, May 2019, NAACL 2019 Long Paper, Computation and Language, Artificial Intelligence, arXiv: 1902. 10186" (Year: 2019).*

(Continued)

*Primary Examiner* — Chineyere Wills-Burns
*Assistant Examiner* — Phuong Hau Cai
(74) *Attorney, Agent, or Firm* — Banner & Witcoff, Ltd.

(57) ABSTRACT

Provided is a model interpretation method, an image processing method, an electronic device and a storage medium, relating to the field of artificial intelligence, in particular to the field of deep learning. The model interpretation method includes: obtaining a token vector corresponding to an image feature input to a first model; obtaining a model prediction result output by the first model; and determining, according to a combination of an attention weight and a gradient, an association relation between the token vector input to the first model and the model prediction result output by the first model, where the association relation is used to characterize interpretability of the first model.

15 Claims, 5 Drawing Sheets

(56) References Cited

OTHER PUBLICATIONS

"Md Mahfuzu Rahman et. al., Geometrically Guided Integrated Gradients, Jun. 2022, arXiv, Computer Science, Computer Vison and Pattern Recognition" (Year: 2022).*

"Hyuk JHin JKwon et. al., Improving Explainability of Integrated Gradients with Guided Non-Linearity, Jan. 2021, 2020 25th International Conference on Pattern Recognition" (Year: 2021).*

Tingyi Yuan et al., Explaining Information Flow Inside Vision, 1st Workshop on explainable AI approaches for debugging and diagnosis (XAI4Debugging@NeurOPS2021), pp. 18.

May 20, 2023 (CN)—First Office Action—Appl. No. 2022111208154.

* cited by examiner

MODEL INTERPRETATION METHOD, IMAGE PROCESSING METHOD, ELECTRONIC DEVICE, AND STORAGE MEDIUM

CROSS-REFERENCE TO RELATED APPLICATIONS

The present application claims priority to Chinese Patent Application No. CN 202211120815.4, filed with the China National Intellectual Property Administration on Sep. 15, 2022, the disclosure of which is hereby incorporated herein by reference in its entirety.

TECHNICAL FIELD

The present disclosure relates to the field of artificial intelligence technology, and in particular, to the field of deep learning.

BACKGROUND

With development of technologies, hardware performance may be improved through artificial intelligence which has diverse applicable application scenarios. For example, in hardware designs involving image processing, video processing, speech recognition, character recognition, target positioning, unmanned driving and other application scenarios, artificial intelligence technology may be adopted, that is, a model may be deployed in hardware to improve processing speed and processing accuracy of the hardware.

However, the model may be considered as a black box model, that is, for a user, the user cannot know how the model works and does decision-making internally to finally output a required prediction result, leading to a problem of low interpretability of the model prediction result. The low interpretability will further lead to problems such as poor universality, poor hardware performance, and the like of the model.

SUMMARY

The present disclosure provides a model interpretation method and apparatus, an image processing method and apparatus, an electronic device and a storage medium.

According to one aspect of the present disclosure, provided is a model interpretation method, including: obtaining a token vector corresponding to an image feature input to a first model; obtaining a model prediction result output by the first model; and determining, according to a combination of an attention weight and a gradient, an association relation between the token vector input to the first model and the model prediction result output by the first model, where the association relation is used to characterize interpretability of the first model.

According to another aspect of the present disclosure, provided is an image processing method, including: inputting a token vector corresponding to an image feature to be processed to a first model, to execute an image processing including at least one of image classification, image recognition, or image segmentation, where the first model obtains an association relation between the token vector input to the first model and a model prediction result output by the first model according to the model interpretation method of the above embodiment, and the association relation is used to characterize interpretability of the first model; and executing at least one of following processing by adopting the association relation: performing compensatory processing on the model prediction result output by the first model according to the association relation, performing reliability assessment processing on the first model according to the association relation, or performing traceability processing on the first model according to the association relation.

According to another aspect of the present disclosure, provided is a model interpretation apparatus, including: a first obtaining module configured to obtain a token vector corresponding to an image feature input to a first model; a second obtaining module, configured to obtain a model prediction result output by the first model; and a model interpretation module, configured to determine, according to a combination of an attention weight and a gradient, an association relation between the token vector input to the first model and the model prediction result output by the first model, where the association relation is used to characterize interpretability of the first model.

According to another aspect of the present disclosure, provided is an image processing apparatus, including: a first processing module, configured to input a token vector corresponding to an image feature to be processed to a first model, to execute an image processing including at least one of image classification, image recognition, or image segmentation, where the first model obtains an association relation between the token vector input to the first model and the model prediction result output by the first model according to the model interpretation method provided by the present disclosure, and the association relation is used to characterize interpretability of the first model; and a second processing module, configured to execute at least one of following processing by adopting the association relation: performing compensatory processing on the model prediction result output by the first model according to the association relation, performing processing of reliability assessment processing on the first model according to the association relation, or performing traceability processing on the first model according to the association relation.

According to another aspect of the present disclosure, provided is an electronic device, including: at least one processor; and a memory connected in communication with the at least one processor, the memory stores an instruction executable by the at least one processor, and the instruction, when executed by the at least one processor, enables the at least one processor to execute the method provided by any embodiment of the present disclosure.

According to another aspect of the present disclosure, provided is a non-transitory computer-readable storage medium storing a computer instruction thereon. The computer instruction is used to cause a computer to execute the method provided by the method provided by any embodiment of the present disclosure.

According to another aspect of the present disclosure, provided is a computer program product including a computer program, and the computer program implements the method provided by any embodiment of the present disclosure, when executed by a processor.

By adopting the disclosure, interpretability of a model may be improved.

It should be understood that the content described in this part is not intended to identify key or important features of the embodiments of the present disclosure, nor is it used to limit the scope of the present disclosure. Other features of the present disclosure will be easily understood by the following description.

BRIEF DESCRIPTION OF THE DRAWINGS

The accompanying drawings are used to better understand the present solution, and do not constitute a limitation to the present disclosure.

DETAILED DESCRIPTION

Hereinafter, descriptions to exemplary embodiments of the present disclosure are made with reference to the accompanying drawings, include various details of the embodiments of the present disclosure to facilitate understanding, and should be considered as merely exemplary. Therefore, those having ordinary skill in the art should realize, various changes and modifications may be made to the embodiments described herein, without departing from the scope and spirit of the present disclosure. Likewise, for clarity and conciseness, descriptions of well-known functions and structures are omitted in the following descriptions.

The term "and/or" herein only describes an association relation of associated objects, which indicates that there may be three kinds of relations, for example, A and/or B may indicate that there is only A exists, or there are both A and B exist, or there is only B exists. The term "at least one" herein indicates any one of many items, or any combination of at least two of the many items, for example, at least one of A, B, or C may indicate any one or more elements selected from a set constituted of A, B, and C. The terms "first" and "second" herein indicate a plurality of similar technical terms and use to distinguish them from each other, but do not limit an order of them or limit that there are only two items, for example, a first feature and a second feature indicate two types of features/two features, a quantity of the first feature may be one or more, and a quantity of the second feature may also be one or more.

In addition, in order to better illustrate the present disclosure, numerous specific details are given in the following detailed description. Those having ordinary skill in the art should be understood that the present disclosure may be performed without certain specific details. In some examples, methods, means, elements and circuits well known to those having skill in the art are not described in detail, in order to highlight the subject matter of the present disclosure.

Figure 1:
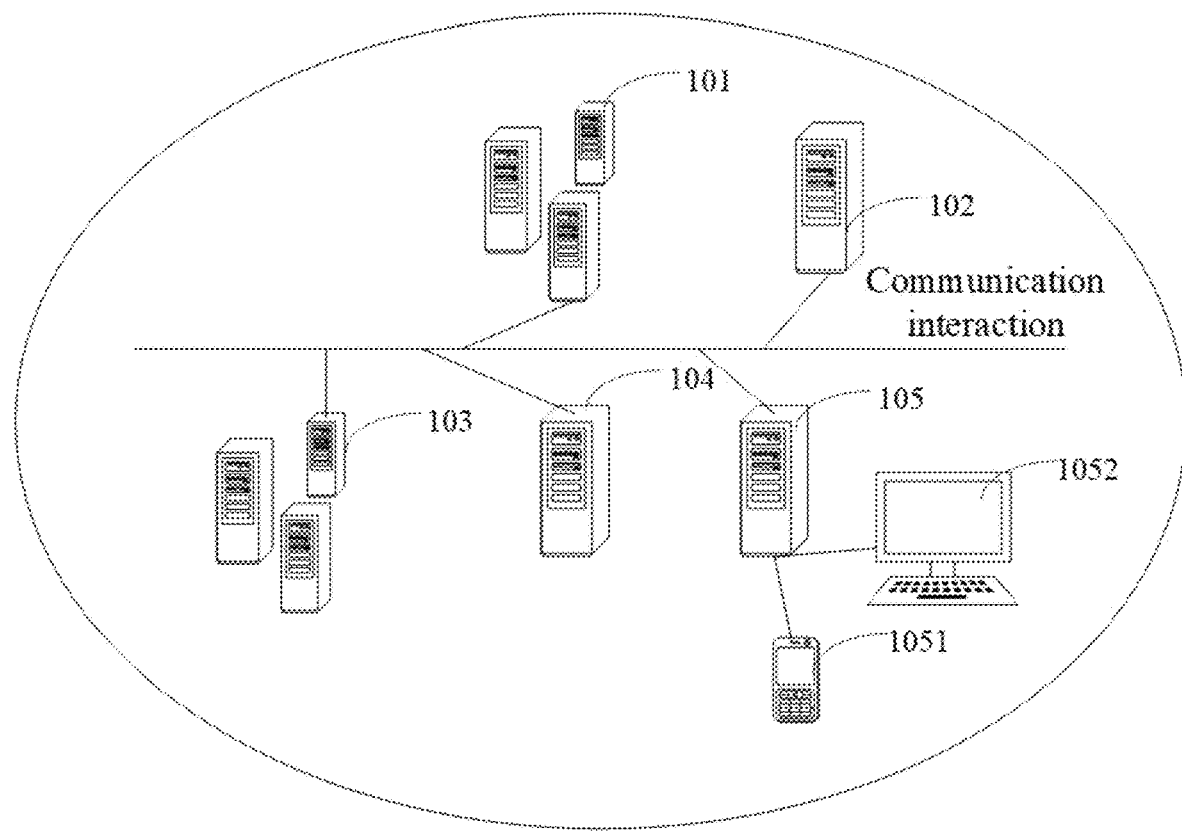
FIG. 1 is a schematic diagram of a distributed cluster processing scenario according to the embodiments of the present disclosure.

According to the embodiments of the present disclosure, FIG. 1 is a schematic diagram of a distributed cluster processing scenario according to the embodiments of the present disclosure. A distributed cluster system is one example of a cluster system, which exemplarily describes that the distributed cluster system may be used to perform model interpretation. The present disclosure is not limited to the model interpretation on a single machine or multi-machines. Accuracy of the model interpretation may be further improved by adopting distributed processing. As shown in FIG. 1, in the distributed cluster system, a plurality of nodes, e.g., a server cluster 101, a server 102, a server cluster 103, a server 104, and a server 105, even electronic devices, such as a mobile phone 1051 and a desktop 1052, connected to the server 105, are included. One or more model interpretation tasks may be executed jointly among the plurality of nodes and between the plurality of nodes and the connected electronic devices. Alternatively, the plurality of nodes in the distributed cluster system may execute the model interpretation tasks by adopting a data parallel relation. Alternatively, data exchange (e.g., data synchronization) may be performed among the plurality of nodes after execution of each model interpretation task is completed.

Figure 2:
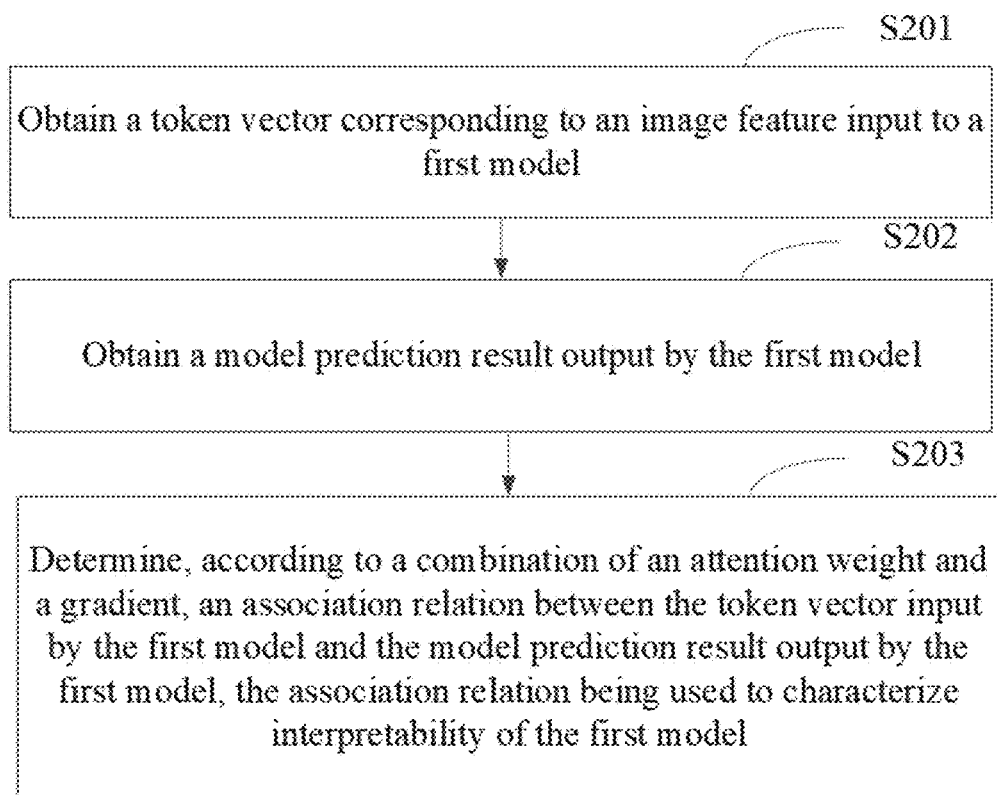
FIG. 2 is a schematic flowchart of a model interpretation method according to the embodiments of the present disclosure.

According to the embodiments of the present disclosure, a model interpretation method is provided. FIG. 2 is a schematic flowchart of the model interpretation method according to the embodiments of the present disclosure. The method may be applied to a model interpretation apparatus. For example, in a case where the apparatus may be deployed in a terminal, a server or other processing devices in a single machine, multi-machines or the cluster system, the model interpretation and other processing may be realized. The terminal may be a User Equipment (UE), a mobile device, a Personal Digital Assistant (PDA), a handheld device, a computing device, an on-board device, a wearable device, or the like. In some possible implementations, the method may also be implemented in a manner that a processor calls a computer-readable instruction stored in a memory. As shown in FIG. 2, the method is applied to any node or electronic device (the mobile phone or the desktop, or the like) in the cluster system shown in FIG. 1, and includes the following steps.

In S201, a token vector corresponding to an image feature input to a first model is obtained.

In S202, a model prediction result output by the first model is obtained.

In S203, an association relation between the token vector input to the first model and the model prediction result output by the first model is determined, according to a combination of an attention weight and a gradient, and the association relation is used to characterize interpretability of the first model.

In one example of S201-S203, the first model may be a transformer model, a convolutional network model including a self-attention mechanism, a cyclic network model including the self-attention mechanism, or the like. The token vector corresponding to the image feature may also be called a token-level vector, which may divide a picture into fixed-size patches without overlapping, and then pull each patch into a one-dimensional vector and record it as a CLS sequence, where n patches represent a length of the CLS sequence input to the first model, for example, if an input picture is 224*224 and the size of each patch is 16*16, then n is 196. In order to facilitate subsequent model prediction processing (for example, if the first model is an image classification model, the model is used for image classification prediction), a learnable token-level vector (a Class token) is introduced, and the token-level vector may be inserted into a beginning position of the CLS sequence. The association relation between the token vector input to the first model and the model prediction result output by the first model is determined according to the combination of the attention weight (perception process for the model interpretation) and the gradient (decision-making process for the model interpretation), so that the interpretability of the first model may be obtained according to the association relation, for example, point-multiplication may be performed on a first interpretation result obtained by the perception process for the model interpretation and a second interpretation result obtained by the decision-making process for the model interpretation, to obtain a final interpretation result which may reflect the interpretability of the first model.

By adopting the present disclosure, the token vector corresponding to the image feature input to the first model may be obtained, and the model prediction result output by the first model may be obtained, the association relation between the token vector input to the first model and the model prediction result output by the first model is determined (the association relation is used to characterize the interpretability of the first model), according to the combination of attention weight and gradient. Since the association relation between the input and output of the first model may be determined, it is clear for a user how the first model (which may be a model to be trained or a model that has been trained) works and how to do decision-making internally, so as to finally output a required model prediction result, and enhance the interpretability of the model prediction result. After the interpretability is enhanced, universality of the first model in a plurality of application scenarios, as well as hardware performance (e.g., processing speed and processing accuracy), or the like, may be further improved.

In one implementation, determining the association relation between the token vector input to the first model and the model prediction result output by the first model according to the combination of the attention weight and the gradient includes performing perception of the model interpretation according to the attention weight to obtain the first interpretation result, performing decision-making of the model interpretation according to the gradient to obtain the second interpretation result, and determining the association relation according to the first interpretation result and the second interpretation result.

Considering that the user is unclear about an internal working principle of the model (for example, how the model works and does the decision-making internally to finally output the required prediction result), leading to poor interpretability. While the model prediction result not only requires considering the accuracy, but also considers the interpretability. Through the interpretability, the user not only may trust the model prediction result, but also compensate the model prediction result based on the interpretation results, and trace a model parameter or the like, and thus performance of the model is further improved by complementing each other. By adopting the present implementation, the interpretability of model prediction result may be enhanced by adopting the combination of the attention weight and the gradient, that is, performing the perception of the model interpretation according to the attention weight and performing the decision-making of the model interpretation according to the gradient. For example, different contribution degrees of different tokens corresponding to image features may be obtained by analyzing the association relation between the input and the output of the model, so as to determine which image feature representation is better to adopt for performing the final decision-making.

In one implementation, performing the perception of the model interpretation according to the attention weight to obtain the first interpretation result includes at least two schemes as follows.

1) Scheme I

For a self-attention module in the first model, the token vector is weighted with a first attention weight (the first attention weight may be weights for different token vectors) to obtain an association relation based on the token vector, and the perception of the model interpretation is performed according to the association relation based on the token vector to obtain the first interpretation result.

2) Scheme II

For the self-attention module in the first model, the token vector is weighted with a second attention weight (the second attention weight may be weights for different attention heads) to obtain an association relation based on an attention head, and the perception of the model interpretation is performed according to the association relation based on the attention head to obtain the first interpretation result.

By adopting the present implementation, for the self-attention module, an estimation method based on feature token or an estimation method based on the attention head may be adopted to obtain different first interpretation results. The point multiplication may be performed on at least one of the different first interpretation results and the second interpretation result to obtain the final interpretation result.

In one implementation, performing the decision-making of the model interpretation according to the gradient to obtain the second interpretation result includes solving an integral gradient from the attention weight to obtain the gradient of the attention weight and performing the decision-making of the model interpretation according to the gradient of the attention weight to obtain the second interpretation result.

By adopting the present implementation, different from solving the gradient from the attention weight directly, performing the decision-making of the interpretation by adopting the integral gradient may reduce interference and improve the accuracy of the interpretation.

In one implementation, the first model is a trained model, or a model to be trained.

By adopting the present implementation, two types of interpretability, one of which is ex post interpretability (for the trained model, the interpretability of the model exists after the model is trained), and the other of which is ex ante interpretability (for the model to be trained or called a pre-training model, the interpretability of the model exists before training the model and is built inside the model). The decision-making obtained through the interpretability may help the user understand a reason for the decision-making, and the user may perceptually understand an internal operation mechanism of the model behind the decision-making (for example, how the model works internally, why the model has such an output, and what the model does the decision-making based on, or the like), so that some uncontrollable risks may be avoided to a certain extent, and reliability of the model is improved.

Figure 3:
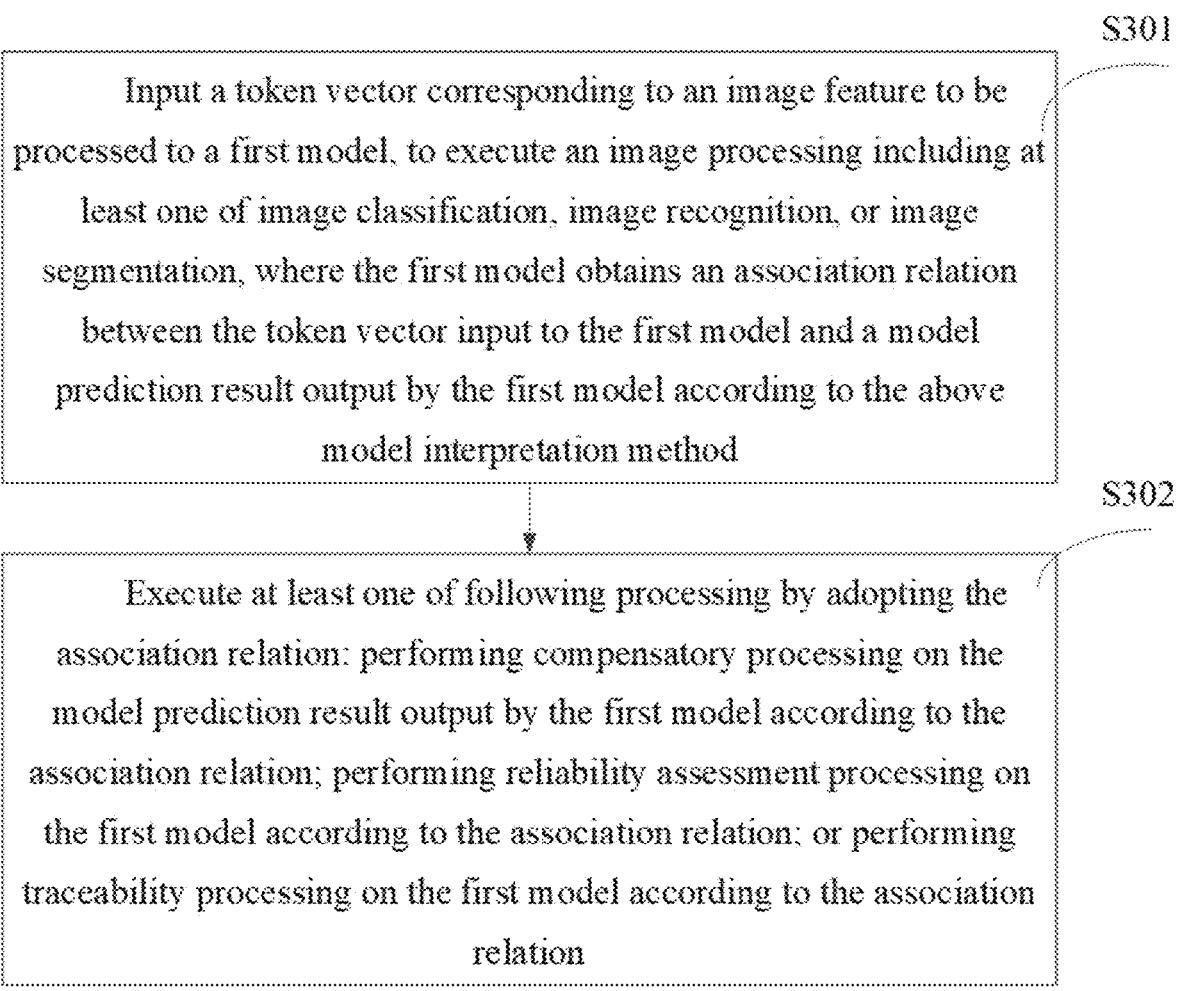
FIG. 3 is a schematic flowchart of an image processing method according to the embodiments of the present disclosure.

According to the embodiments of the present disclosure, an image processing method is provided. FIG. 3 is a schematic flowchart of an image processing method of a model according to the embodiments of the present disclosure. This method may be applied to an image processing apparatus.

For example, in a case where the apparatus may be deployed in a terminal, a server or other processing devices in a single machine, multi-machines or the cluster system, the model interpretation and other processing may be realized. The terminal may be a User Equipment (UE), a mobile device, a Personal Digital Assistant (PDA), a handheld device, a computing device, an on-board device, a wearable device, or the like. In some possible implementations, the method may also be implemented in a manner that a processor calls a computer-readable instruction stored in a memory. As shown in FIG. 3, the method is applied to any node or electronic device (the mobile phone or the desktop, or the like) in the cluster system shown in FIG. 1, which includes the following steps.

In S301, a token vector corresponding to an image feature to be processed is input to the first model, to execute an image processing including at least one of image classification, image recognition, or image segmentation.

The first model obtains the association relation between the token vector input to the first model and the model prediction result output by the first model according to the above model interpretation method, the association relation is used to characterize the interpretability of the first model.

In S302, at least one of following processing is executed by adopting the association relation: performing compensatory processing on the model prediction result output by the first model according to the association relation; preforming reliability assessment processing on the first model according to the association relation; or performing traceability processing on the first model according to the association relation.

In one example of S301-S302, applicable scenarios of the above model interpretation method is not limited to image processing, but may also include: image and video understanding, speech recognition, text understanding and generation, unmanned driving scene recognition, medical image analysis and diagnosis, and the like. Performing the compensatory processing on the model prediction result output by the first model according to the association relation may improve the accuracy of the model prediction result. Performing the reliability assessment processing on the first model according to the association relation improves the user's trust for the model and enhances end-to-end interpretability of the model. Performing the traceability processing on the first model according to the association relation may perform analysis after the model is deployed to hardware, and thus an interpretation result obtained based on the analysis provides a possibility for traceability of the model and increases data support. The performance of the model may be further improved by applying the model interpretation method to various images, videos, voices, text, unmanned driving, medical treatment, or the like.

It should be noted that the present disclosure takes the first model as the transformer model for example, the transformer model is a network structure composed of the self-attention mechanism, which may replace a traditional convolutional neural network, a cyclic neural network and other structures. As a transformation network of deep self-attention mechanism, the transformer model and its variants, with strong scalability, learning long distance and other advantages, have achieved good results in understanding and generating tasks in the field of natural language processing, as well as in three major image problems that is, classification, detection and segmentation. Tasks such as visual and language pre-training, image super-resolution, video repair and video object tracking are also becoming popular directions for the transformer model, and application and design based on a structure of the transformer model have also achieved good results.

However, the user does not understand what features are extracted from the transformer model to do the final decision-making. As a deep learning model, the transformer model is also regarded as a black box model. The user cannot know how this black box works internally, why it has such output, and what the decision-making is based on. It is necessary to enhance the interpretability of the transformer model to clarify contribution degrees of different token features in various application scenarios and improve the performance of the model.

For the interpretability of the transformer model, a method based on gradient backhaul, a forward derivation method and a combination of the two methods as described below are included.

(1) The method based on gradient backhaul represented by SmoothGrad and initialization gradient (IntGrad) explains a differentiable model, and estimates the relation between the output and the input of the model by directly using gradient information of the input under a specific output condition, so as to calculate importance of an input feature. For this method of calculating the importance of the input feature by using the gradient backhaul, since a model based on the self-attention mechanism is usually deep and there are many non-linear parts like a linear rectification function (ReLU) in each attention unit, the gradient may introduce a lot of noise during a backhaul processing, thus results in poor results of an output feature.

(2) The forward derivation method represented by location-routing problem (LRP) and Attention Rollout takes the input as a benchmark. The forward derivation method according to model inference processing is not only cumbersome, but also cannot distinguish in different output categories. Considering that one image or one piece of text may contain a plurality of individuals, therefore, it is difficult to distinguish differences in input features of the model when judging different categories.

(3) The combination of two methods represented by Generic Attention, Transformer Attribution and Attention CAM obtained according to CAM heat map, that is, a quantification method for contribution degrees of the input features for the different output categories by combining the gradient with an intermediate variable of the model takes the gradient as the weight of attention distribution, and then combine superposition of these attention in inference processing to operate weighted attention distribution. However, due to some differences between this superposition method and actual inference processing of the model, an important input feature may be missed during superposition processing, leading to a decrease in confidence of the interpretation results.

Figure 4:
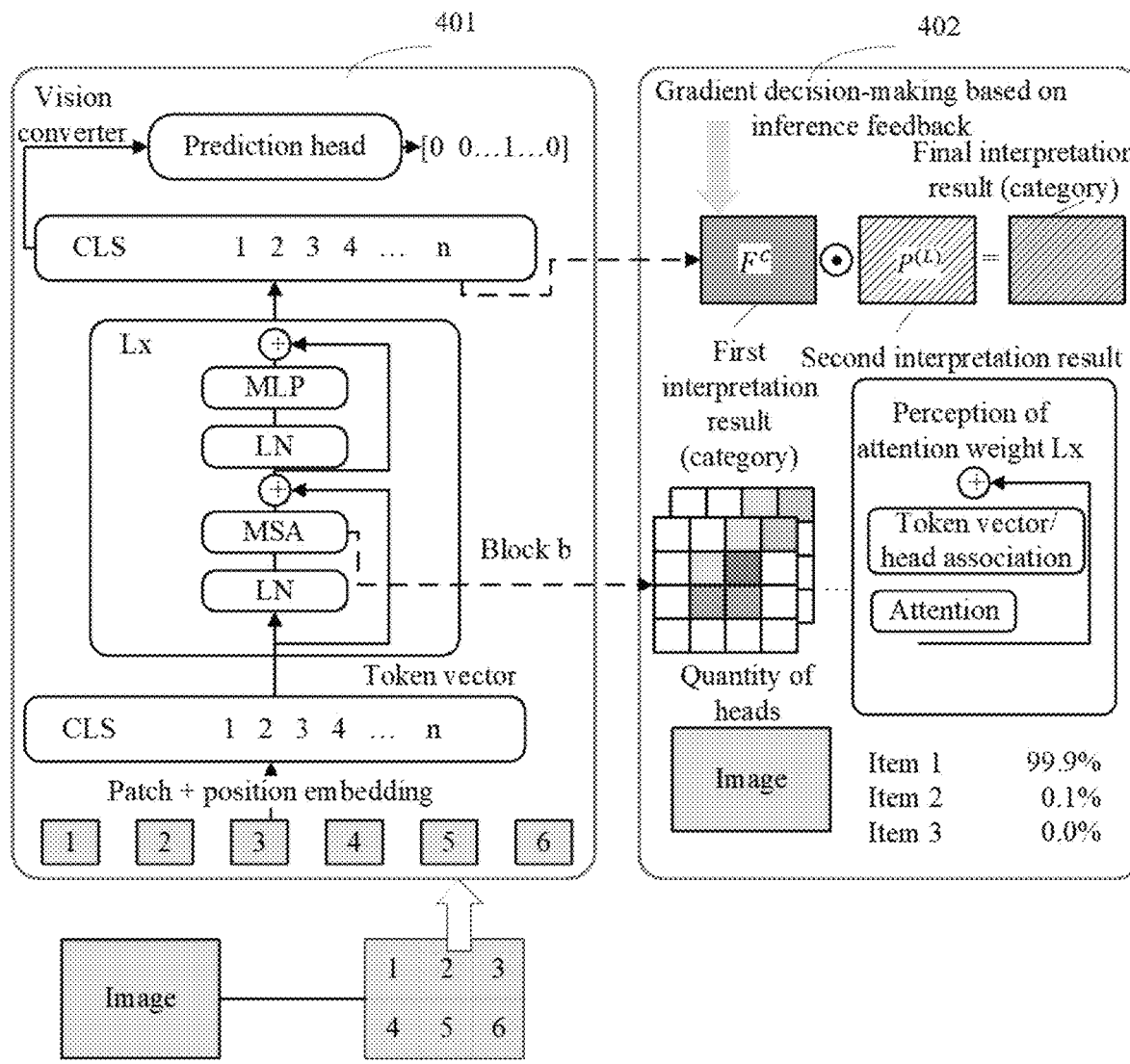
FIG. 4 is a schematic diagram of an inference framework by adopting a combination of perception and decision-making to perform model interpretation in an application example according to embodiments of the present disclosure.

In this application example, interpretation of inference processing of the transformer model is divided into two steps by using a chain rule of information theory according to the combination of the attention weight and the gradient, the two steps includes: performing the perception processing of the interpretation based on the attention and performing the decision-making processing of the interpretation based on the gradient. As shown in FIG. 4, in FIG. 4, a transformer model 401, and interpretation processing 402 for the transformer model (that is, performing the perception of the model interpretation according to the attention weight and performing the decision-making of the model interpretation according to the gradient) are included. Lx represents L self-attention modules (L is an integer greater than 1), and CLS is a sequence composed of the token vectors obtained after an image feature is token. Multi-Layer Perceptron (MLP), Layer Normalization (LN), and Multi-head self-attention (MSA) mechanism are included in the Lx. A feature map with a size of "height (H)*width (W)*category (C)" is divided into a plurality of blocks (windows) through the MSA mechanism and each block (window) performs multi-head attention processing.

1. Interpretation Framework of the Transformer Model Based on the Chain Rule.

The chain rule is used to explore contribution degree of each token in the decision-making processing of the model. It is supposed that the i-th token is represented independently as $\tilde{X}_i$, all tokens together form a new set of bases $\{\widetilde{X_1}, \ldots, \tilde{X}_i, \ldots, \widetilde{X_p}\}$, and a gradient of a loss function $L^c$ to each token is used to represent the contribution degree of this token, that is, $$\frac{\partial L^c}{\partial \tilde{X}_i}.$$

From the chain rule of partial derivative, it may be obtained:

$$\frac{\partial L^c}{\partial \tilde{X}_i} = \frac{\partial L^c}{\partial Z^{CLS}} \frac{\partial Z^{CLS}}{\partial \tilde{X}_i}.$$

$Z^{CLS}$ is [CLS] token of a last attention layer.

$$\frac{\partial L^c}{\partial Z^{CLS}}$$

is approximated by $F^c$, and the contribution degree of each input token in the [CLS] token is represented by $P^{(L)}$, so for the i-th token, it may be obtained:

$$\frac{\partial L^c}{\partial \tilde{X}_i} =$$

$$\frac{\partial L^c}{\partial Z^{CLS}} \frac{\partial Z^{CLS}}{\partial \tilde{X}_i} \approx (F_1^c, \ldots, F_i^c, \ldots, F_p^c)(0, \ldots, P_i^{(L)}, \ldots, 0) = F_i^c P_i^{(L)}.$$

For all tokens, the contribution degree of each token may be represented as $F^c \odot P^{(L)}$. In other words, the principle of the above chain rule may be adopted to disassemble the two interpretation processing in the interpretation framework of the above transformer model (that is, performing the perception of the model interpretation according to the attention weight and performing the decision-making of the model interpretation according to the gradient), and then after the point multiplication is performed on the interpretation results obtained by the above two interpretation processing, that is, the first interpretation result and the second interpretation result, the final interpretation result (in terms of graph classification, that is, the final interpretation result for the graph classification) is obtained.

2. Performing the Perception Process $P^{(L)}$ of the Interpretation Based on the Attention.

The self-attention module is a very important component of the transformer model. Different from the convolutional network or the cyclic network, the self-attention module obtains the attention weight by model trainable parameter to weight the input. Therefore, attention weights obtained for different inputs may reflect the contribution degrees of different features to some extent. Considering that the decision-making processing of the deep neural network includes firstly obtaining a good representation, and then using this representation to do the final decision-making. Thus, the attention weight may be used to analyze the contribution degrees of different features of this representation in a learning part, including estimation based on the token and estimation based on the attention head as follows.

A transformer model with L self-attention modules, where an input image or text is pre-processed to obtain p independent tokens, information transfer between input and output of each attention module l may be analyzed:

$$Z^{(l)} = (A^{(l)}Z^{(l-1)}W^{(l)} + Z^{(l-1)})W_{MLP}^{(l)}.$$

$Z^{(l)}$ is the output of the module, $Z^{(l-1)}$ is the input of the module, $A^{(l)}$ is a self-attention weight of the module, and $W^{(l)}$ and $W_{MLP}^{(l)}$ are transformations for the feature of this module.

When $W^{(l)}$ is an identity matrix, a recursion formula of Attention Rollout may be obtained:

$$Z^{(l)} \approx (A^{(l)} + I)Z^{(l-1)}W_{MLP}^{(l)}.$$

In the estimation processing based on the token, when $W^{(l)}$ is estimated as weights for different tokens (that is, the first attention weight), a recursive relation based on the token may be obtained:

$$A_{token} = [\alpha_1 A_{\cdot,1}; \ldots; \alpha_c A_{\cdot,c}; \ldots; \alpha_p A_{\cdot,p}], \alpha_c = \frac{\left\|(Z^{(l-1)}W^{(l)})_{c,\cdot}\right\|}{\left\|Z_{c,\cdot}^{(l-1)}\right\|},$$

$$Z^{(l)} \approx (A_{token}^{(l)} + I)Z^{(l-1)}W_{MLP}^{(l)}.$$

In the estimation processing based on the attention head, when $W^{(l)}$ is estimated as weights for different attention heads (that is, the second attention weight), a recursive relation based on attention head may be obtained:

$$A_{head} = \sum_{h=1}^{N_{head}} \left(\frac{I_h^{(l)}}{\sum_h I_h^{(l)}}\right) A_h^{(l)}, I_h = (A_h)^T \frac{\partial L^c}{\partial A_h},$$

$$Z^{(l)} \approx (A_{head}^{(l)} + I)Z^{(l-1)}W_{MLP}^{(l)}.$$

According to the recursive relation, it may be obtained:

$$\begin{pmatrix} Z^{CLS} \\ \ldots \\ Z_p^{(L)} \end{pmatrix} = (A_*^{(L)} + I) \ldots (A_*^{(1)} + I) \begin{pmatrix} (X_1 E + E_{pos}^1)W_{MLP}^{(L)} \ldots W_{MLP}^{(1)} \\ \ldots \\ (X_p E + E_{pos}^p)W_{MLP}^{(L)} \ldots W_{MLP}^{(1)} \end{pmatrix} =$$

$$(A_*^{(L)} + I) \ldots (A_*^{(1)} + I) \begin{pmatrix} \tilde{X}_1 \\ \ldots \\ \tilde{x}_c \end{pmatrix}.$$

Since $P^{(L)}$ represents the contribution degree of each input token in the [CLS] token, $P^{(L)}=(A_*^{(L)}+I) \ldots (A_*^{(1)}+I)$ is obtained.

According to the recursive relation based on the token and the attention head, different first interpretation results $P^{(L)}$ may be obtained respectively, which are recorded as $P_{head}^{(L)}=(A_{head}^{(L)}+I) \ldots (A_{head}^{(1)}+I)$, and $P_{token}^{(L)}=(A_{token}^{(L)}+I) \ldots (A_{token}^{(1)}+I)$ respectively.

3. Performing the Decision-Making Processing $F^c$ of the Interpretation Based on Gradient.

Considering that for most transformer variants, the model prediction result is performed by [CLS] of a last attention module. Therefore, the interpretation for the decision-making processing may be realized through the gradient of the attention weight. The direct use of the gradient may introduce noise, and the integral gradient (discretized Riemann integral) may be adopted to obtain the interpretation result (that is, the second interpretation result $F^c$) by taking an all-black image as a benchmark and adopting a linear route:

$$F^c = \operatorname{ReLU}\left(\frac{1}{K}\sum_{k=1}^{K} \frac{\partial L^c\left(\frac{k}{K}X\right)}{\partial A^{(L)}}\right) \xrightarrow{K\to\infty} \operatorname{ReLU}\left(\int_{\alpha=0}^{1} \frac{\partial L^c(\alpha X)}{\partial A^{(L)}} d\alpha\right).$$

4. Interpretation Result for a Specific Input.

For a model that uses the [CLS] of the last attention module to perform the prediction, the final interpretation result may be written as $(F^c \odot P^{(L)})_0$, where the subscript 0 refers to the second to the last column of the first row.

By adopting this application example, the model interpretation performed according to the combination of the attention weight and the gradient achieves good results in a noise test and a segmentation test by taking tests on different models, and may be used as an interpretable method of Transformer to help the model to further improve performance and interpretation prediction result.

Figure 5:
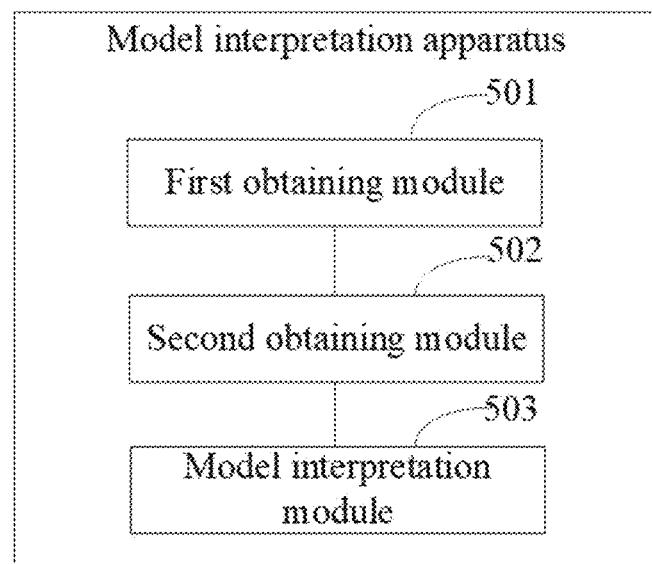
FIG. 5 is a schematic diagram of composition structure of a model interpretation apparatus according to embodiments of the present disclosure.

According to the embodiments of the present disclosure, a model interpretation apparatus is provided. FIG. 5 is a schematic diagram of composition structure of the model interpretation apparatus according to the embodiments of the present disclosure. As shown in FIG. 5, the model interpretation apparatus includes a first obtaining module 501 configured to obtain the token vector corresponding to the image feature input to the first model; a second obtaining module 502 configured to obtain the model prediction result by the first model output; and a model interpretation module 503 configured to determine the association relation between the token vector input to the first model and the model prediction result output by the first model according to the combination of the attention weight and the gradient, the association relation being used to characterize the interpretability of the first model.

In one implementation, the model interpretation module 503 is configured to perform the perception of the model interpretation according to the attention weight to obtain the first interpretation result; perform the decision-making of the model interpretation according to the gradient to obtain the second interpretation result; and determine the association relation according to the first interpretation result and the second interpretation result.

In one implementation, the model interpretation module 503 is configured to weight the token vector with the first attention weight for the self-attention module in the first model to obtain the association relation based on the token vector; and perform the perception of the model interpretation according to the association relation based on the token vector to obtain the first interpretation, where the first attention weight is weights for the different token vectors.

In one implementation, the model interpretation module 503 is configured to weight the token vector with the second attention weight for the self-attention module in the first model to obtain the association relation based on the attention head; and perform the perception of the model interpretation according to the association relation based on the attention head to obtain the first interpretation, where the second attention weight is weights for the different attention heads.

In one implementation, the model interpretation module 503 is configured to solve the integral gradient from the attention weight to obtain the gradient of the attention weight; and perform the decision-making of the model interpretation according to the gradient of the attention weight to obtain the second interpretation result.

In one implementation, the first model is a trained model, or a model to be trained.

Figure 6:
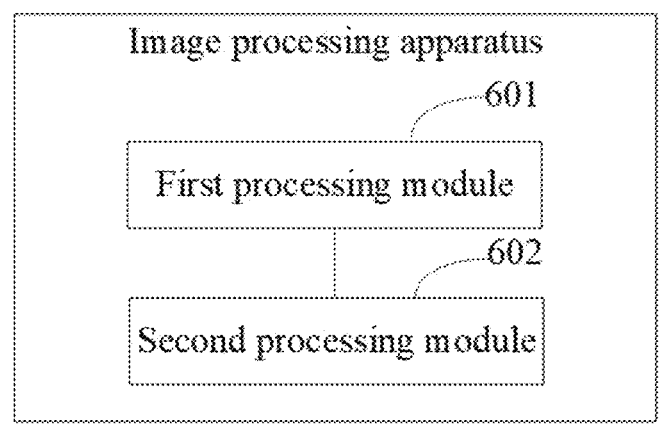
FIG. 6 is a schematic diagram of composition structure of an image processing apparatus according to embodiments of the present disclosure.

According to the embodiments of the present disclosure, an image processing apparatus is provided. FIG. 6 is a schematic diagram of composition structure of the model interpretation apparatus according to the embodiments of the present disclosure. As shown in FIG. 6, the image processing apparatus includes a first processing module 601 and a second processing module 602. The first processing module 601 is configured to input the token vector corresponding to the image feature to be processed into the first model, to execute an image processing including at least one of image classification, image recognition, or image segmentation. The first model obtains the association relation between the token vector input to the first model and the model prediction result output by the first model according to any interpretation method of the embodiments, and the association relation is used to characterize the interpretability of the first model.

The second processing module 602 is configured to execute at least one of following processing by adopting the association relation: performing the compensatory processing on the model prediction result output by the first model according to the association relation; preforming the reliability assessment processing on the first model according to the association relation; or performing the traceability processing on the first model according to the association relation.

In the technical solution of the present disclosure, acquisition, storage and application of the user's personal information involved are all in compliance with provisions of relevant laws and regulations, and do not violate public order and good customs.

According to the embodiments of the present disclosure, the present disclosure also provides an electronic device, a readable storage medium and a computer program product.

Figure 7:
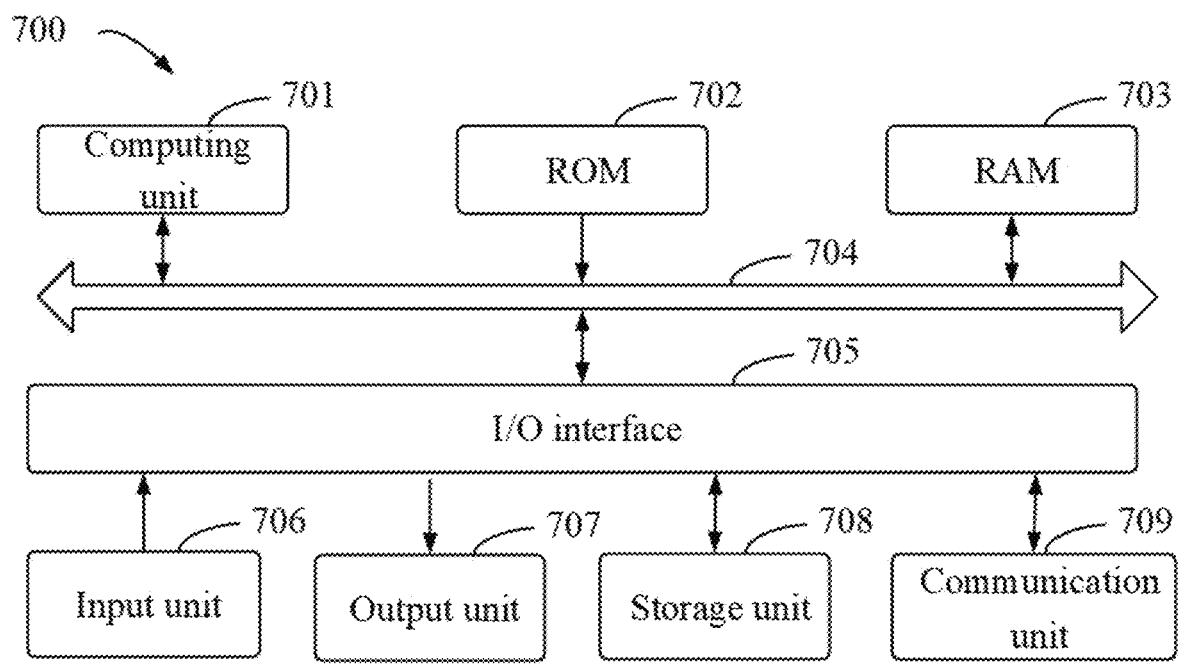
FIG. 7 is a block diagram of an electronic device for implementing a model interpretation method/a image processing method according to embodiments of the present disclosure.

FIG. 7 shows a schematic bock diagram of an exemplary electronic device 700 that may be used to implement the embodiments of the present disclosure. The electronic device is intended to represent various forms of digital computers, such as a laptop, a desktop, a workstation, a personal digital assistant, a server, a blade server, a mainframe computer, and other suitable computers. The electronic device may also represent various forms of mobile devices, such as a personal digital processing, a cellular phone, a smart phone, a wearable device and other similar computing devices. The components shown herein, their connections and relationships, and their functions are merely examples, and are not intended to limit the implementation of the present disclosure described and/or required herein.

As shown in FIG. 7, the electronic device 700 includes a computing unit 701 that may perform various appropriate actions and processes according to a computer program stored in a Read-Only Memory (ROM) 702 or a computer program loaded from a storage unit 708 into a Random-Access Memory (RAM) 703. Various programs and data required for an operation of the electronic device 700 may also be stored in the RAM 703. The computing unit 701, the ROM 702 and the RAM 703 are connected to each other through a bus 704. An input/output (I/O) interface 705 is also connected to the bus 704.

A plurality of components in the electronic device 700 are connected to the I/O interface 705, and include an input unit 706 such as a keyboard, a mouse, or the like; an output unit 707 such as various types of displays, speakers, or the like; the storage unit 708 such as a magnetic disk, an optical disk, or the like; and a communication unit 709 such as a network card, a modem, a wireless communication transceiver, or the like. The communication unit 709 allows the electronic device 700 to exchange information/data with other devices through a computer network such as the Internet and/or various telecommunication networks.

The computing unit 701 may be various general-purpose and/or special-purpose processing components with processing and computing capabilities. Some examples of the computing unit 701 include, but are not limited to, a Central Processing Unit (CPU), a Graphics Processing Unit (GPU), various dedicated Artificial Intelligence (AI) computing chips, various computing units that run machine learning model algorithms, a Digital Signal Processor (DSP), and any appropriate processors, controllers, microcontrollers, or the like. The computing unit 701 performs various methods and processing described above, such as the model interpretation method/the image processing method. For example, in some implementations, the model interpretation method/the image processing method may be implemented as a computer software program tangibly contained in a computer-readable medium, such as the storage unit 708. In some implementations, a part or all of the computer program may be loaded and/or installed on the electronic device 700 via the ROM 702 and/or the communication unit 709. When the computer program is loaded into RAM 703 and executed by the computing unit 701, one or more steps of the model interpretation method/the image processing method described above may be performed. Alternatively, in other implementations, the computing unit 701 may be configured to perform the model interpretation method/the image processing method by any other suitable means (e.g., by means of firmware).

Various implements of the system and technologies described above herein may be implemented in a digital electronic circuit system, an integrated circuit system, a Field Programmable Gate Array (FPGA), an Application Specific Integrated Circuit (ASIC), Application Specific Standard Parts (ASSP), a System on Chip (SOC), a Complex Programmable Logic Device (CPLD), a computer hardware, firmware, software, and/or a combination thereof. These various implementations may be implemented in one or more computer programs, and the one or more computer programs may be executed and/or interpreted on a programmable system including at least one programmable processor. The programmable processor may be a special-purpose or general-purpose programmable processor, may receive data and instructions from a storage system, at least one input device, and at least one output device, and transmit the data and the instructions to the storage system, the at least one input device, and the at least one output device.

The program code for implementing the method of the present disclosure may be written in any combination of one or more programming languages. The program code may be provided to a processor or controller of a general-purpose computer, a special-purpose computer or other programmable data processing devices, which enables the program code, when executed by the processor or controller, to cause the function/operation specified in the flowchart and/or block diagram to be implemented. The program code may be completely executed on a machine, partially executed on the machine, partially executed on the machine as a separate software package and partially executed on a remote machine, or completely executed on the remote machine or a server.

In the context of the present disclosure, a machine-readable medium may be a tangible medium, which may contain or store a procedure for use by or in connection with an instruction execution system, device or apparatus. The machine-readable medium may be a machine-readable signal medium or a machine-readable storage medium. The machine-readable medium may include, but is not limited to, an electronic, magnetic, optical, electromagnetic, infrared or semiconductor system, device or apparatus, or any suitable combination thereof. More specific examples of the machine-readable storage medium may include electrical connections based on one or more lines, a portable computer disk, a hard disk, a Random Access Memory (RAM), a Read-Only Memory (ROM), an Erasable Programmable Read-Only Memory (EPROM or a flash memory), an optical fiber, a portable Compact Disc Read-Only Memory (CD-ROM), an optical storage device, a magnetic storage device, or any suitable combination thereof.

In order to provide interaction with a user, the system and technologies described herein may be implemented on a computer that has: a display apparatus (e.g., a cathode ray tube (CRT) or a Liquid Crystal Display (LCD) monitor) for displaying information to the user; and a keyboard and a pointing device (e.g., a mouse or a trackball) through which the user may provide input to the computer. Other types of devices may also be used to provide interaction with the user. For example, feedback provided to the user may be any form of sensory feedback (e.g., visual feedback, auditory feedback, or tactile feedback), and the input from the user may be received in any form (including an acoustic input, a voice input, or a tactile input).

The system and technologies described herein may be implemented in a computing system (which serves as, for example, a data server) including a back-end component, or in a computing system (which serves as, for example, an application server) including a middleware, or in a computing system including a front-end component (e.g., a user computer with a graphical user interface or web browser through which the user may interact with the implementation of the system and technologies described herein), or in a computing system including any combination of the back-end component, the middleware component, or the front-end component. The components of the system may be connected to each other through any form or kind of digital data communication (e.g., a communication network). Examples of the communication network include a Local Area Network (LAN), a Wide Area Network (WAN), and the Internet.

A computer system may include a client and a server. The client and server are generally far away from each other and usually interact with each other through a communication network. A relationship between the client and the server is generated by computer programs running on corresponding computers and having a client-server relationship with each other. The server may be a cloud server, a distributed system server, or a blockchain server.

It should be understood that, the steps may be reordered, added or removed by using the various forms of the flows described above. For example, the steps recorded in the present disclosure can be performed in parallel, in sequence, or in different orders, as long as a desired result of the technical scheme disclosed in the present disclosure can be realized, which is not limited herein.

The foregoing specific implementations do not constitute a limitation on the protection scope of the present disclosure. Those having skill in the art should understand that, various modifications, combinations, sub-combinations and substitutions may be made according to a design requirement and other factors. Any modification, equivalent replacement, improvement or the like made within the spirit and principle of the present disclosure shall be included in the protection scope of the present disclosure.

What is claimed is:

1. A model interpretation method, comprising:
obtaining a token vector corresponding to an image feature input to a first model, wherein the token vector corresponding to the image feature is a token-level vector, in which an image is divided into fixed-size patches without overlapping, each patch of the fixed-size patches is pulled into a one-dimensional vector, and all one-dimensional vectors of the fixed-size patches are recorded as a Classification Token (CLS) sequence;
obtaining a model prediction result output by the first model;
performing, according to an attention weight, perception of model interpretation, to obtain a first interpretation result, comprising one of:
  adopting an estimation method based on a feature token, to obtain the first interpretation result, and
  adopting an estimation method based on an attention head, to obtain the first interpretation result;
solving an integral gradient from the attention weight, to obtain a gradient of the attention weight;
performing, according to the gradient of the attention weight, decision-making of the model interpretation, to obtain a second interpretation result; and
performing point-multiplication on the first interpretation result and the second interpretation result, to obtain an association relation between the token vector input to the first model and the model prediction result output by the first model, wherein the association relation is used to characterize interpretability of the first model.

2. The method of claim 1, wherein in a case where the estimation method based on the feature token is adopted, performing, according to the attention weight, the perception of the model interpretation, to obtain the first interpretation result, comprises:
weighting, for a self-attention module in the first model, the token vector with a first attention weight, to obtain an association relation based on the token vector, wherein the first attention weight is weights for different token vectors; and
performing, according to the association relation based on the token vector, the perception of the model interpretation, to obtain the first interpretation result.

3. The method of claim 1, wherein in a case where the estimation method based on the attention head is adopted, performing, according to the attention weight, the perception of the model interpretation, to obtain the first interpretation result, comprises:
weighting, for a self-attention module in the first model, the token vector with a second attention weight, to obtain an association relation based on the attention head, wherein the second attention weight is weights for different attention heads; and
performing, according to the association relation based on the attention head, the perception of the model interpretation, to obtain the first interpretation result.

4. The method of claim 1, wherein the first model is a trained model, or a model to be trained.

5. An image processing method, comprising:
inputting a token vector corresponding to an image feature to be processed to a first model, to execute an image processing including at least one of image classification, image recognition, or image segmentation,
wherein the first model obtains an association relation between the token vector input to the first model and a model prediction result output by the first model, according to the model interpretation method of claim 1, and the association relation is used to characterize interpretability of the first model; and
executing at least one of following processing by adopting the association relation:
performing, according to the association relation, compensatory processing on the model prediction result output by the first model;
performing, according to the association relation, reliability assessment processing on the first model; or
performing, according to the association relation, traceability processing on the first model.

6. An electronic device, comprising:
at least one processor; and
a memory connected in communication with the at least one processor;
wherein the memory stores an instruction executable by the at least one processor, and the instruction, when executed by the at least one processor, enables the at least one processor to execute operations, comprising:
inputting a token vector corresponding to an image feature to be processed to a first model, to execute an image processing including at least one of image classification, image recognition, or image segmentation,
wherein the first model obtains an association relation between the token vector input to the first model and a model prediction result output by the first model, according to the model interpretation method of claim 1, and the association relation is used to characterize interpretability of the first model; and
executing at least one of following processing by adopting the association relation:
performing, according to the association relation, compensatory processing on the model prediction result output by the first model;
performing, according to the association relation, reliability assessment processing on the first model; or
performing, according to the association relation, traceability processing on the first model.

7. A non-transitory computer-readable storage medium storing a computer instruction thereon, wherein the computer instruction is used to cause a computer to execute operations, comprising:
inputting a token vector corresponding to an image feature to be processed to a first model, to execute an image processing including at least one of image classification, image recognition, or image segmentation, wherein the first model obtains an association relation between the token vector input to the first model and a model prediction result output by the first model, according to the model interpretation method of claim 1, and the association relation is used to characterize interpretability of the first model; and executing at least one of following processing by adopting the association relation:

performing, according to the association relation, compensatory processing on the model prediction result output by the first model;

performing, according to the association relation, reliability assessment processing on the first model; or performing, according to the association relation, traceability processing on the first model.

8. An electronic device, comprising:

at least one processor; and a memory connected in communication with the at least one processor;

wherein the memory stores an instruction executable by the at least one processor, and the instruction, when executed by the at least one processor, enables the at least one processor to execute operations, comprising:

obtaining a token vector corresponding to an image feature input to a first model, wherein the token vector corresponding to the image feature is a token-level vector, in which an image is divided into fixed-size patches without overlapping, each patch of the fixed-size patches is pulled into a one-dimensional vector, and all one-dimensional vectors of the fixed-size patches are recorded as a Classification Token (CLS) sequence;

obtaining a model prediction result output by the first model;

performing, according to an attention weight, perception of model interpretation, to obtain a first interpretation result, by one of:

adopting an estimation method based on a feature token, to obtain the first interpretation result, and adopting an estimation method based on an attention head, to obtain the first interpretation result;

solving an integral gradient from the attention weight, to obtain a gradient of the attention weight;

performing, according to the gradient of the attention weight, decision-making of the model interpretation, to obtain a second interpretation result; and performing point-multiplication on the first interpretation result and the second interpretation result, to obtain an association relation between the token vector input to the first model and the model prediction result output by the first model, wherein the association relation is used to characterize interpretability of the first model.

9. The electronic device of claim 8, wherein in a case where the estimation method based on the feature token is adopted, performing, according to the attention weight, the perception of the model interpretation, to obtain the first interpretation result, comprises:

weighting, for a self-attention module in the first model, the token vector with a first attention weight, to obtain an association relation based on the token vector, wherein the first attention weight is weights for different token vectors; and performing, according to the association relation based on the token vector, the perception of the model interpretation, to obtain the first interpretation result.

10. The electronic device of claim 8, wherein in a case where the estimation method based on the attention head is adopted, performing, according to the attention weight, the perception of the model interpretation, to obtain the first interpretation result, comprises:

weighting, for a self-attention module in the first model, the token vector with a second attention weight, to obtain an association relation based on the attention head, wherein the second attention weight is weights for different attention heads; and performing, according to the association relation based on the attention head, the perception of the model interpretation, to obtain the first interpretation result.

11. The electronic device of claim 8, wherein the first model is a trained model, or a model to be trained.

12. A non-transitory computer-readable storage medium storing a computer instruction thereon, wherein the computer instruction is used to cause a computer to execute operations, comprising:

obtaining a token vector corresponding to an image feature input to a first model, wherein the token vector corresponding to the image feature is a token-level vector, in which an image is divided into fixed-size patches without overlapping, each patch of the fixed-size patches is pulled into a one-dimensional vector, and all one-dimensional vectors of the fixed-size patches are recorded as a Classification Token (CLS) sequence;

obtaining a model prediction result output by the first model;

performing, according to an attention weight, perception of model interpretation, to obtain a first interpretation result, comprising one of:

adopting an estimation method based on a feature token, to obtain the first interpretation result, and adopting an estimation method based on an attention head, to obtain the first interpretation result;

solving an integral gradient from the attention weight, to obtain a gradient of the attention weight;

performing, according to the gradient of the attention weight, decision-making of the model interpretation, to obtain a second interpretation result; and performing point-multiplication on the first interpretation result and the second interpretation result, to obtain an association relation between the token vector input to the first model and the model prediction result output by the first model, wherein the association relation is used to characterize interpretability of the first model.

13. The non-transitory computer-readable storage medium of claim 12, wherein in a case where the estimation method based on the feature token is adopted, performing, according to the attention weight, the perception of the model interpretation, to obtain the first interpretation result, comprises:

weighting, for a self-attention module in the first model, the token vector with a first attention weight, to obtain an association relation based on the token vector, wherein the first attention weight is weights for different token vectors; and performing, according to the association relation based on the token vector, the perception of the model interpretation, to obtain the first interpretation result.

14. The non-transitory computer-readable storage medium of claim 12, wherein in a case where the estimation method based on the attention head is adopted, performing, according to the attention weight, the perception of the model interpretation, to obtain the first interpretation result, comprises:
　　weighting, for a self-attention module in the first model, the token vector with a second attention weight, to obtain an association relation based on the attention head, wherein the second attention weight is weights for different attention heads; and
　　performing, according to the association relation based on the attention head, the perception of the model interpretation, to obtain the first interpretation result.

15. The non-transitory computer-readable storage medium of claim 12, wherein the first model is a trained model, or a model to be trained.

\* \* \* \* \*